July 3, 1962 D. D. ROBERTSON 3,041,993

SIGNAL TRANSLATING SYSTEM

Filed Dec. 27, 1945 3 Sheets-Sheet 1

INVENTOR
D. D. ROBERTSON

BY

ATTORNEY

SIGNAL TRANSLATING SYSTEM

Filed Dec. 27, 1945 3 Sheets-Sheet 2

INVENTOR
D.D.ROBERTSON

BY

ATTORNEY

INVENTOR
D.D.ROBERTSON
BY
[signature]
ATTORNEY

United States Patent Office 3,041,993

Patented July 3, 1962

3,041,993

SIGNAL TRANSLATING SYSTEM

Donald D. Robertson, Hartsdale, N.Y., assignor to Bell Telephone Laboratories, Incorporated, New York, N.Y., a corporation of New York Filed Dec. 27, 1945, Ser. No. 637,409
7 Claims. (Cl. 114—23)

This invention relates to control circuits and more particularly to echo ranging systems especially suitable for steering control of moving bodies, such as torpedoes.

One general object of this invention is to simplify the construction and to improve the performance of echo ranging systems and more particularly of torpedo steering control circuits including such systems.

In one illustrative embodiment of this invention, an echo ranging system especially adapted for torpedo steering control comprises a pair of hydrophones mounted upon opposite sides of the torpedo body, a transmitter for energizing the hydrophones repeatedly at a preassigned recurrence rate to propagate signal pulses of prescribed duration, a receiver for which the hydrophones serve as input elements, and an operating element controlled by the receiver in response to echoes of the signal pulses received thereby. The receiver comprises a pair of substantially identical signal channels each of which includes an amplifier coupled to a respective hydrophone, a detector for rectifying the amplifier output, a normally disabled direct current amplifier controlled by the detector and an operating element, for example a relay, included in the output circuit of the direct current amplifier.

In accordance with one feature of this invention, means controlled from the transmitter circuit are provided for disabling the detectors during the pulse propagating periods, whereby false operation of the operating elements is prevented. More specifically, in accordance with one feature of this invention, a normally nonconducting discharge device is associated with the detectors so as to apply a blocking bias thereto when it is rendered conductive and the device is rendered conductive simultaneously with the energization of the hydrophones by the transmitter.

In accordance with another feature of this invention, means are provided for controlling the gain of the amplifiers during the intervals between signal pulses in such manner as to compensate for variations in echo level with distance between the hydrophones and the object from which the echoes emanate. More specifically, in accordance with this feature of the invention, a resistance-condenser combination is provided in the control circuit for the amplifier and a portion of the transmitter power is fed to the amplifier during each pulsing period, whereby the condenser is charged to a high negative potential, the combination being constructed and arranged so that immediately upon cessation of each pulsing period the condenser voltage falls quickly to a preassigned value and thereafter decreases at a prescribed rate to increase the sensitivity of the receiver in such manner as to compensate for decreases in echo level with increase in the distance between the hydrophones and the object at which the echoes originate.

In accordance with a further feature of this invention, means are provided for deriving from a received echo a control voltage for the direct current amplifier of duration substantially longer than the echo signal, whereby the direct current amplifier is rendered conducting for a period of correspondingly long duration. More specifically, in accordance with this feature of the invention, in a system wherein the operating elements are magnetic relays, a condenser is provided common to the load circuit of the detector and the input circuit for the direct current amplifier and is so constructed and arranged as to apply to the control grid of this amplifier a potential sufficient to render the amplifier conducting for a period at least as long as the build-up or operate time of the relay.

The problem solved by the invention is that of steering the torpedo to strike a target vessel which is the object of a frontal attack. The torpedo, launched on an approximate collision course toward the bow of the target, is steered by a conventional gyro system on its initial course until an echo received by one or the other hydrophone indicates that its course will carry it to one side of the target, either because the course was incorrectly set or because the target has taken evasive action. At that moment the gyro must be disabled, by means apart from the present invention, and the torpedo's rudder must be set hard over to send the torpedo on a circular course to strike the target disregarding later echoes received by either hydrophone.

The rudder operation is effected by the system of the invention, which provides for:

(*a*) protecting the receiving amplifiers from sound waves which should be ignored, such as shell bursts or reflections from unimportant objects;

(*b*) varying the sensitivity of the receiving amplifiers to compensate the enfeeblement of target echoes with distance from target to torpedo; and (*c*) locking the rudder control so that later echoes shall not interfere. There results a substantial increase in the effective size of the target; the entire length of the target vessel is in effect substituted for its beam.

The invention and the above-noted and other features thereof will be understood more clearly and fully from the following detailed description with reference to the accompanying drawing in which.

Figure 1:
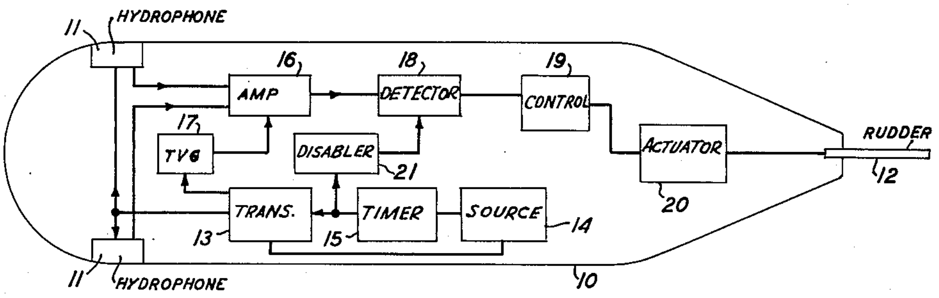
FIG. 1 is a diagram, mainly in block form, of a torpedo and a steering system therefor illustrative of one embodiment of this invention.

Referring now to the drawing, the torpedo illustrated in FIG. 1 comprises a body 10, a pair of hydrophones 11 mounted on the port and starboard sides of the body and directed outwardly substantially at right angles thereto, and a rudder 12 which is controlled by an echo ranging type steering control system for which the hydrophones 11 serve as both signal propagating and signal receiving elements.

The echo ranging control system comprises a supersonic transmitter 13 connected to the hydrophones 11 and energized from a source 14 under control of a timer 15 so that supersonic signal pulses of preassigned recurrence rate and duration are propagated by the hydrophones. The hydrophones 11 are associated with and constitute the input elements for a receiver comprising an amplifier system 16, certain stages thereof being provided with time variation of gain control 17, a detector 18 coupled to the output of the amplifier and a control element 19 which controls the rudder actuator 20 to effect deflection of the rudder in one or the opposite direction in accordance with which of the hydrophones receives an echo of the propagated signal pulses. In order to prevent operation of the receiver during the pulse propagating periods, a disabler 21, controlled by the timer 15, is provided for rendering the detector 18 inoperative during these periods.

Briefly, the general operation of the system as thus far described is as follows: When the torpedo is launched, it may be directed toward the target, for example a surface vessel. The transmitter, under control of the timer, energizes both the hydrophones whereby supersonic signal pulses are propagated. During the pulse propagating periods, the detector 18 is disabled. When an echo of at least a preassigned intensity is received by either of the hydrophones 11, the control 19 is operated accordingly to cause deflection of the rudder 12 by the actuator 20, thereby to steer the torpedo to port or starboard in accordance with which of the hydrophones received the echo, that is to steer the torpedo toward the target. Once the control causes operation of the actuator, the rudder remains in the position to which it had been deflected so that the torpedo follows a circular path to collide with the target.

Figure 2:
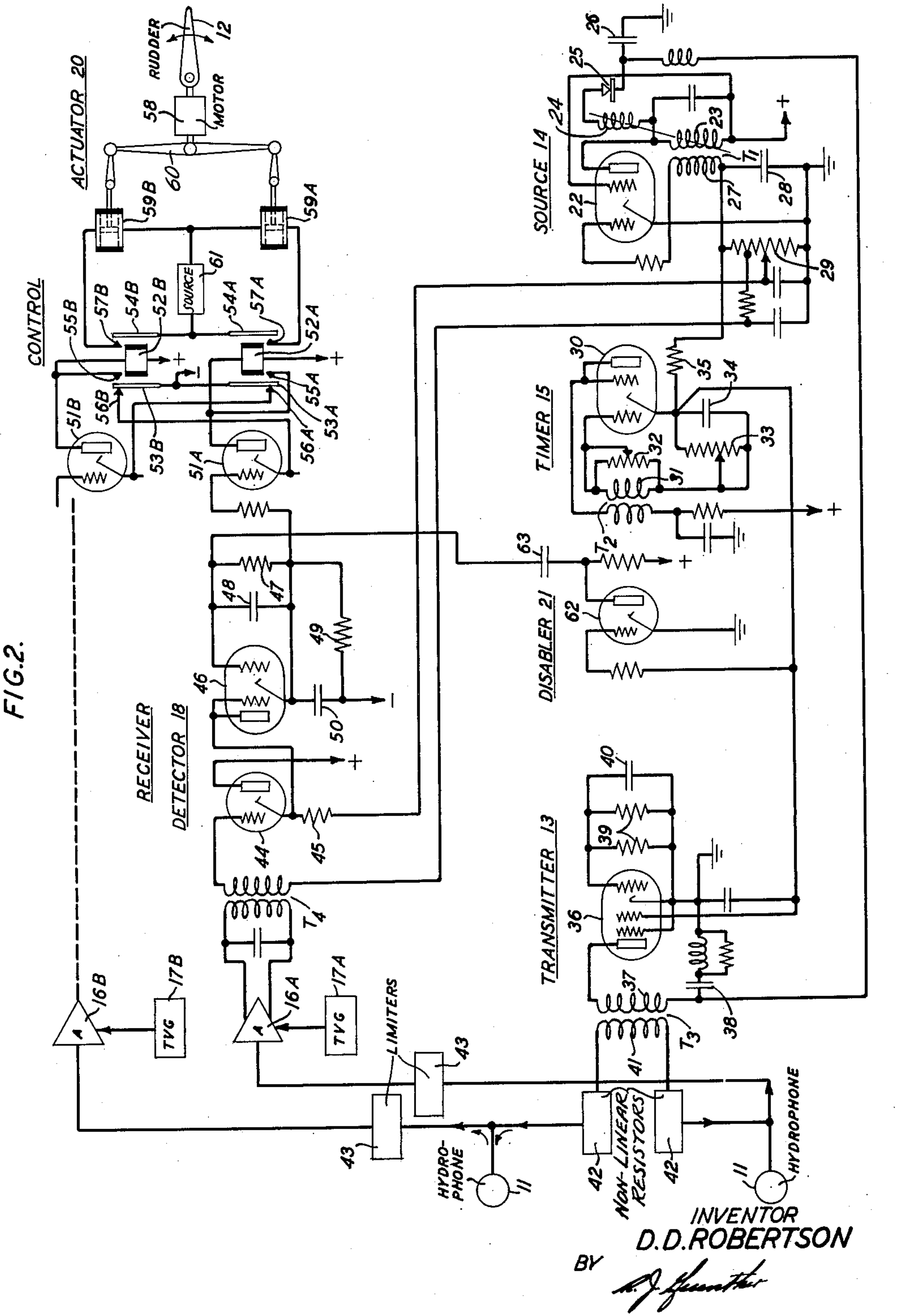
FIG. 2 is a circuit diagram of the steering system, certain components of the receiver portion thereof being shown in block form.
Figure 3:
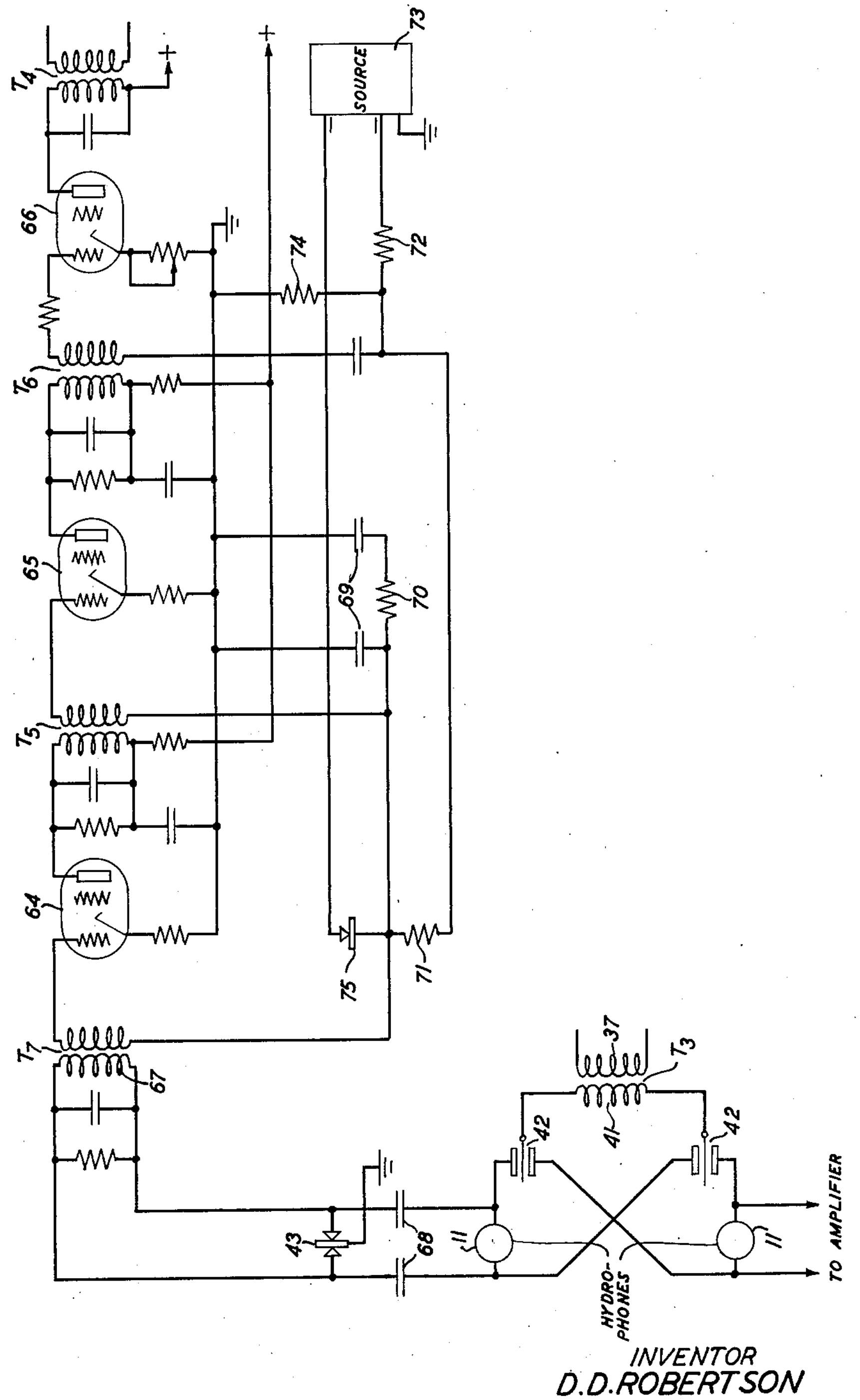
FIG. 3 is a circuit diagram showing in detail the input end of the receiver portion of the system shown in FIG. 2.

Details of an echo ranging control system illustrative of one embodiment of this invention are shown in FIGS. 2 and 3. The source 14 comprises an electronic oscillator whose frequency is substantially higher than that of the signal pulses to be propagated, to prevent interference effects. For example, if the frequency of the signal pulses is 24 kilocycles, the oscillator frequency may be 200 kilocycles. Specifically, the oscillator comprises a screen grid tube 22 and a coupling transformer $T_1$ having a two-part secondary winding 23, 24, the winding 24 having a rectifier 25 and condenser 26 in series therewith, and the primary winding 27 having in series therewith a condenser 28 bridged by a potentiometer resistance 29 whereby, as is apparent, direct current voltages are developed across the condenser 26 and the resistance 29. The circuit constants are made such that the voltage appearing across the condenser 26 is high, for example of the order of 1,000 volts, and that appearing across the resistance 29 is relatively low, for example of the order of 67 volts.

The timer 15 is a self-blocking oscillator and comprises an electron discharge device 30 and a coupling transformer $T_2$, the grid winding 31 of which has in shunt therewith a potentiometer resistance 32. The grid circuit of the device 30 includes also a second potentiometer resistance 33 connected across the condenser 34. The cathode of the device 30 is connected to the negative side of the resistance 29 by way of a suitable resistor 35. The oscillator 30 produces high frequency pulses, e.g., of 150 kilocycles, of preasssigned period and recurrence rate determined by the potentiometers 32 and 33 respectively. For example, these potentiometers may be adjusted so that the oscillator 30 produces 150-kilocycle pulses of 3 milliseconds duration and 150-millisecond intervals between successive pulses.

The transmitter 13 is a high frequency, e.g., 24-kilocycle oscillator comprising an electron discharge device 36, the screen grid of which is connected directly to the cathode of the device 30 as shown and, thus, is biased negatively relative to the cathode of the device 36. The anode circuit of the device 36 includes the primary winding 37 of the output transformer $T_3$ and a high voltage condenser 38 which is in series with the condenser 26 over an obvious circuit. The grid circuit of the device 36 includes the parallel resistance-condenser combination 39, 40.

Because of the negative bias upon its screen grid, the device 36 normally is non-conductive. However, when the timer device 30 is conducting, i.e., when it oscillates for a 3-millisecond period in the particular case noted, its control grid is driven positive and its plate impedance falls abruptly whereby the potential of its cathode increases abruptly, becomes positive and approaches the anode potential. For example, in a typical case wherein the anode potential of the device 30 is 300 volts, when the device 30 oscillates the cathode potential becomes about 250 volts positive. Consequently, inasmuch as the screen grid of the device 36 is tied directly to the cathode of the device 30 as noted heretofore, when the device 30 is oscillating, the blocking bias on the screen grid is overcome and the device 36 is rendered conducting for the duration of the pulsing period, 3 milliseconds in the case noted, of the device 30. Hence, the device 36 oscillates for 3 milliseconds. While the device 36 is quiescent, the condenser 38, being in circuit with the condenser 26 as noted heretofore, is charged to a high potential, e.g., 1,000 volts. When the device 36 is enabled, the condenser 38 discharges therethrough so that a high power pulse of 3 milliseconds duration is supplied to the output transformer $T_3$ and the hydrophones 11, which are connected to the secondary winding 41 of the transmitter, propagate 24-kilocycle signal pulses of 3-millisecond duration.

In order to effectively disconnect the hydrophones 11 from the transmitter 13 in the intervals between pulses, non-linear resistors 42 are provided between each hydrophone 11 and the secondary winding 41, the resistors being of a material, such as a form of silicon carbide known as "Thyrite," characterized by a very high resistance at low voltages and a low resistance at high voltages. Thus, during the pulse propagating periods the hydrophones 11 are connected, effectively, directly to the transmitter; in the intervals between pulses, the resistors 42 in effect disconnect the hydrophones from the transmitter, at least for such signals as may be received by the hydrophones of intensity comparable to that of echoes of the propagated pulses.

The receiver portion of the echo ranging system comprises two substantially identical signal channels for each of which a respective hydrophone constitutes the input element. In view of the identity of the two channels, only one has been shown in detail in the drawing and will be described herein. Such corresponding parts of the two channels as are shown in the drawing are designated by the same reference numeral plus the channel identifying letter A or B. Each channel comprises an amplifier 16, certain stages of which are provided with time variation of gain control 17, coupled to the respective hydrophone 11 by way of a limiter 43, the function of which will appear presently. The amplifier output is supplied to a threshold device, for example an electron discharge device 44, by way of a transformer $T_4$. The device 44, the grid and cathode biasing potentials for which are derived from the potentiometer 29 as shown, is so biased that it becomes conducting only when an input voltage of at least a pre-assigned magnitude is supplied thereto. When the device 44 conducts, a direct current voltage is developed across the cathode resistor 45.

This voltage is supplied to an electron discharge device 46, which functions as a gate, the anode of which is tied to the cathode of the device 44 as shown and the cathode of which is biased negative somewhat less than the bias upon the cathode of the device 44. The grid circuit of the device 46 includes the parallel resistance-condenser combination 47, 48 and the load circuit includes the resistance-condenser combination 49, 50. When the device 44 is conducting in response to an echo signal of sufficient intensity received by the hydrophone 11, the voltage appearing across the cathode resistor 45 is translated by the device 46 and a voltage is established across the resistor 49, which voltage will decay at a rate determined by the time constant of the circuit defined by the resistor 49 and condenser 50, at the cessation of the echo signal.

This voltage is applied to the control grid of a direct current amplifier device 51 the plate circuit of which includes a relay 52, the device 51 being biased so that in the absence of an echo signal voltage upon its control grid it is non-conducting. Each relay 52 is provided with a pair of armatures 53 and 54 and associated contacts 55, 56 and 57 respectively. As is apparent from FIG. 2, when either relay 52 operates, it locks up over its contact 55 and also disables the other relay. That is to say, when the relay 52A operates, a lock-up circuit therefor is closed at the contact 55A and also the energizing circuit for the relay 52B is opened at the contact 56A. Similarly, when the relay 52B operates, it locks up by virtue of closure of the contact 55B and the energizing circuit for the relay 52A is broken at the contact 56B. Thus, when either relay operates, it disables the other relay permanently.

The individual echo signals received by the hydrophones are of short duration, e.g., 3 milliseconds, so that the voltage pulse applied to the device 46 likewise is of short duration. The relays 52, however, inherently have a build-up time which may be substantially longer than the duration of the echo signal. However, as noted heretofore, upon the cessation of the echo pulse, the voltage across the resistor 49 decays at a rate determined by the time constant of the discharge circuit for the condenser 50. This time constant is made such that the voltage impressed upon the control electrode of the device 51A remains of a value sufficient to render this device conducting for a time long enough to allow operation of the relay 52. Thus, in effect, short echo pulses are converted into relatively long energizing signals for the relays.

The relays control the actuator 20 which, in one form illustrated in FIG. 2, comprises a reversible motor 58 coupled to the rudder 12 to deflect it in one or the opposite direction, the direction being determined by which of the solenoids 59, the armatures of which are coupled to a control element for the motor 58 by a linkage 60, is energized. The energizing circuit for each solenoid comprises the source 61 and the armature 54 and associated contact 57 of the respective relay 52.

As is apparent, which of the relays 52 is operated, and, hence, the direction of deflection of the rudder 12, is determined by which of the hydrophones 11 first receives an echo of sufficient intensity to break through the threshold set by the device 44 of the respective channel in the receiver. This will be determined in turn by the course of the torpedo relative to the target, i.e., upon whether the target is to port or starboard of the torpedo. Of course, the motor 58 is so associated with the relays that when one relay operates the rudder is deflected to turn the torpedo toward the target.

As has been noted heretofore, a disabler 21 is provided for preventing operation of the receiver to cause deflection of the rudder during the periods that signal pulses are propagated by the hydrophones 11. The disabler, as shown in FIG. 2, comprises an electron discharge device 62, the control grid of which is connected directly to the cathode of the device 30 so that when the device 30 is non-conducting the device 62 is blocked. The anode of the device 62 is connected to the grid of the device 46 by way of a suitable condenser 63 as shown.

Normally, the grid of the device 46 is at such potential that the device is capable of transferring the voltage appearing across the cathode resistor 45 of the thresold device 44, and also the disabler device 62 is blocked. However, as has been pointed out heretofore, during the periods of pulse propagation by the hydrophones 11, the cathode of the device 30 is at a high positive potential so that, during these periods, a high positive potential is applied to the control electrode of the disabler device 62 and it becomes conducting. Consequently, a negative pulse appears in the anode circuit of the disabler device 62 and a negative pulse sufficient to block the device 46 is applied to the grid circuit of the latter by way of the condenser 63. The time constant of the resistance-condenser combination 47, 48 in the grid circuit of the device 46 is made such that this device remains blocked for the duration of each pulsing period, i.e., for 3 milliseconds in the particular case noted heretofore.

Details of a typical amplifier 16 constructed in accordance with one feature of this invention are shown in FIG. 3. The amplifier comprises a pair of controlled gain stages 64 and 65 coupled by the transformer $T_5$ and a fixed gain stage 66 coupled to the stage 65 by a transformer $T_6$. The input and output sides of the controlled gain stages 64 and 65 are tuned broadly to the frequency of the transmitter device 36, e.g., 24 kilocycles in the particular case noted heretofore, and the fixed gain stage 66 is tuned sharply to this frequency so that it determines the gain-frequency characteristic of the receiver.

The primary winding 67 of the input transformer $T_7$ is connected to one of the hydrophones 11 by way of series condensers 68 and is bridged by the limiter 43, for example a bidirectional non-linear resistor of the "Thyrite" type, having such characteristic as to limit the power which can be fed to the input transformer from the transmitter 13 during the pulse transmitting periods to a preassigned value.

The control grid circuits for the devices 64 and 65 include a pair of equal condensers 69 connected at one side by a resistor 70 which is connected in common to the secondary winding of the input transformer $T_7$ and to a point of negative potential on a source 73, by way of resistors 71 and 72. A rectifier 75, for example of the copper-cuprous oxide type, is connected between the one side noted of the condensers 69 and a somewhat higher negative potential point on the source 73. The other side of the condensers 69 is connected to ground, as shown and the resistor 72 also is connected to ground by way of a resistor 74. In an illustrative system, the condensers 69 may be held nominally at the order of 6 volts negative relative to ground and the rectifier 75 may be connected to a point on the source 73 of the order of 12 volts negative relative to ground. As is apparent, the condensers 69 are bridged by two parallel circuits, one constituted by the resistors 71 and 74 in series and the other constituted by the rectifier 75 and a portion of the source 73.

Of course, the bias upon the control grids of the devices 64 and 65 and, hence, the gain of these devices, at any instant is determined by the potentials appearing across the condensers at that time. Normally, as noted above, these condensers are at a 6-volt potential negative with respect to ground. During each pulse transmitting period, a portion of the transmitter power is supplied to the receiver so that the condensers are raised to a higher negative potential, for example of the order of 40 to 50 volts, relative to ground. At the end of the pulse transmitting period, the condensers discharge through the rectifier 75 so that their potential falls quickly, say within of the order of one-half millisecond, to a value approaching 12 volts negative relative to ground. When the potential across the rectifier 75 approaches zero, the rectifier, being unidirectional, presents a very high impedance so that further discharge therethrough is effectively prevented. The condensers then discharge through the path defined by the resistors 71 and 74 until the condenser potential reaches the norminal value of 6 volts negative.

Figure 4:
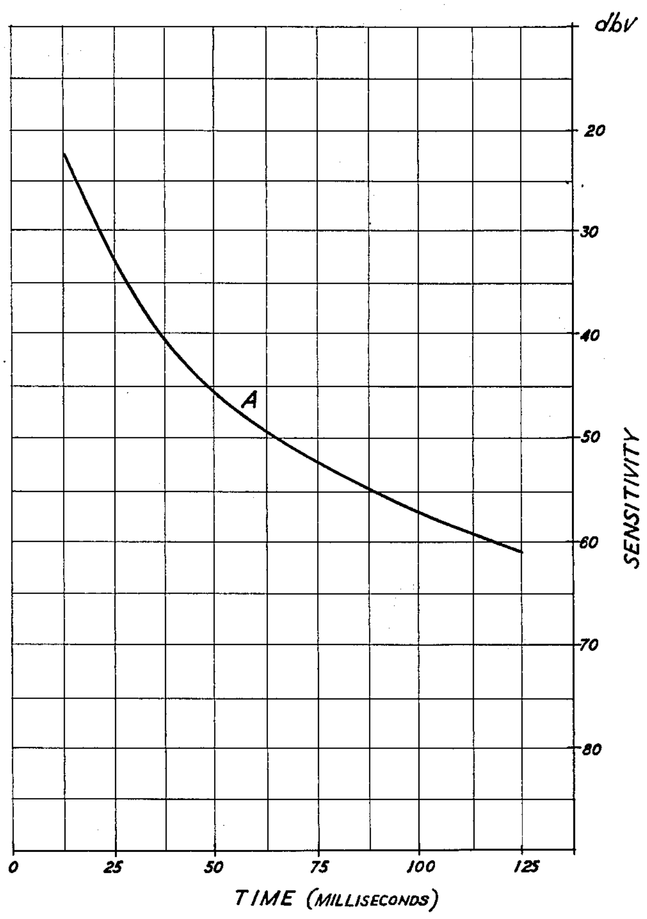
FIG. 4 is a graph illustrating a typical time-sensitivity characteristic of a time variation of gain controlled amplifier, such as shown in FIG. 3, constructed in accordance with this invention.

Thus, immediately following the end of the pulse transmitting period, the gain of the amplifier stages 64 and 65 is low and thereafter it increases at a rate determined by the time constant of the circuit defined by the condensers 69 and resistors 71 and 74. The circuit parameters are so correlated that the gain increases to the maximum in a time substantially equal to the interval between pulses and at substantially the same rate as the echo intensity decreases with distance between the torpedo and the object, e.g. target, from which the echoes emanate. Thus, the gain control compensates for decrease in echo intensity with distance so that a substantially constant echo signal level is obtained. A typical sensitivity-time characteristic for an amplifier provided with gain control as described above is shown by curve A in FIG. 4. The echo amplitude, however, as a function of the size and character of the object from which the echo emanates is unaffected by the time variation of gain control so that, as noted heretofore, an echo of at least a preassigned intensity is requisite to break through the threshold set by the device 64. The latter, therefore, functions to prevent false operation of the receiver circuit by echoes from objects other than the desired target, which may be in the field of the echo ranging system.

To recapitulate, in the operation of the steering system having parameters of the magnitudes and relations set forth hereinabove, 24-kilocycle pulses are propagated by the hydrophones 11 for 3-millisecond periods at 150-millisecond intervals. During each of these periods the detector device 46 is disabled and the condensers 69 are driven highly negative relative to ground. During the intervals between pulsing periods, the hydrophones 11 function as listening devices. Also during these intervals, the gain of the amplifier devices 64 and 65 is controlled to compensate for decreases in echo intensity with distance and the condenser 38 is charged preparatory to the propagation of the next pulse. When an echo signal of at least a preassigned intensity, as determined by the threshold device 44, is received by either hydrophone, the corresponding relay 52 operates, locks in and causes operation of the motor 58 to deflect the rudder in the direction to turn the torpedo toward the target. Inasmuch as the operated relay locks in and disables the other relay, subsequent echoes received by the hydrophones cannot produce any steering action, so that the torpedo is steered along a circular course to collide with the target.

Although a specific embodiment of the invention has been shown and described, it will be understood that it is but illustrative and that various modifications may be made therein without departing from the scope and spirit of this invention as defined in the appended claims.

What is claimed is:

1. A torpedo steering system comprising a rudder, actuating means for deflecting said rudder in one or the opposite direction, control means for said actuating means for determining the direction of deflection of said rudder thereby, said control means comprising a pair of normally disabled first amplifiers each having a relay in its output circuit and said relays being associated with said actuating means to effect deflection of said rudder in one direction or the other in accordance with which of said relays operates, and an echo ranging system for enabling one or the other of said amplifiers in accordance with the direction, relative to the torpedo, of the source from which echoes received by the system emanate, said echo ranging system comprising a pair of hydrophones mounted upon opposite sides of the torpedo, a normally disabled pulse generator coupled to said hydrophones, a receiver including a pair of signal translating channels for each of which a respective hydrophone constitutes the input element and a respective one of said first amplifiers constitutes the output element, each of said channels including also a second amplifier coupled to the respective hydrophone and a detector coupling the second amplifier to the respective first amplifier, a limiter between each hydrophone and the respective second amplifier, means for simultaneously enabling said pulse generator for periods of preassigned duration and recurrence rate and disabling the detectors for the duration of said periods, gain control means coupled to the input circuit of each of said second amplifiers and energized in part by the power received by said second amplifiers during said periods for controlling the bias upon said second amplifiers to increase to gain thereof at a prescribed rate immediately following each of said periods and means included in the coupling between each detector and the associated first amplifier for converting echo signal pulses applied to the detector into enabling voltages for the amplifier of duration at least as long as the operate time of the respective relay.

2. An echo ranging system comprising a signal transceiver, transmitter means coupled to said transceiver for supplying signal pulses thereto, a receiver including an amplifier having its input circuit coupled to said transceiver, operating means controlled by said amplifier, and means for controlling the gain of said amplifier to increase it at a prescribed rate from a minimum immediately following the application of each signal pulse to said transceiver, said gain controlling means comprising a bias controlling condenser connected to the input circuit of said amplifier to be charged to a prescribed high negative potential in response to application of each signal pulse to said transceiver, means for charging said condenser normally to a preassigned negative potential less than said prescribed potential, a first resistance discharge path for said condenser, and a second discharge path for said condenser, said second discharge path including an impedance element having a low resistance for voltages across said condenser above a certain value between said prescribed and preassigned potentials and a resistance great in comparison to that of said first discharge path, for voltages across said condenser below said certain value.

3. An echo ranging system comprising a signal transceiver, a transmitter coupled to said transceiver for applying signal pulses thereto, a receiver including an amplifier having its input coupled to said transceiver, operating means controlled by said amplifier, and means for controlling the gain of said amplifier to increase it at a preassigned rate immediately following application of each signal pulse to said transceiver, said gain controlling means comprising a bias controlling condenser included in the input circuit of said amplifier, a first resistive discharge path for said condenser, a second discharge path for said condenser including a rectifier, and means for charging said condenser normally to a preassigned potential with reference to a point in said input circuit and for applying to said rectifier a prescribed voltage higher than said preassigned potential with reference to said point, said rectifier being poled with reference to said condenser to allow said condenser to discharge therethrough when its potential relative to said point is higher than said prescribed voltage.

4. An echo ranging system comprising a signal transceiver, transmitter means coupled to said transceiver for applying signal pulses thereto, a receiver including an amplifier, means including a voltage limiter coupling said transceiver to the input of said amplifier, and means for controlling the gain of said amplifier to increase it at a prescribed rate immedately following the application of each signal pulse to said transceiver, said gain controlling means comprising a bias controlling condenser included in the input circuit of said amplifier to be charged in accordance with the energy received by said circuit when pulses are applied to said transceiver, means for quickly discharging said condenser to a preassigned value substantially instantaneously upon the cessation of application of said pulses and means for thereafter gradually discharging said condenser at a prescribed rate.

5. An echo ranging system comprising means for propagating signal pulses of prescribed length and recurrence rate, a receiver responsive to echoes of said pulses, and an operating element energized by the ouput of said receiver and having an operate time greater than the length of said pulses, said receiver comprising a detector energized in accordance with said echoes, means for deriving from said detector in response to each echo pulse applied thereto a voltage of duration at least as long as said time, and means controlled by said voltage for effecting operation of said element.

6. An echo ranging system comprising means for propagating signal pulses of preassigned duration and recurrence rate, a detector energized in accordance with echo signals corresponding to said pulses, a relay having a build-up time substantially longer than the signal pulse duration, means for converting the output of said detector into a control voltage of duration at least as long as said build-up time, and means controlled in accordance with said voltage for energizing said relay.

7. An echo ranging system comprising means for propagating signal pulses of preassigned duration and recurrence rate, a direct current amplifier normally biased to be nonconducting, a relay included in the output circuit of said amplifier and having a build-up time longer than the duration of each signal pulse, a detector, receiver means for applying to said detector echo signals corresponding in length to said signal pulses, and a resistance-condenser combination included in the load circuit of said detector and the input circuit of said amplifier for converting each echo signal received by said detector into a voltage sufficient to render said amplifier conducting for a period at least as long as said build-up time.

References Cited in the file of this patent

UNITED STATES PATENTS

| | | |
|---|---|---|
| 1,916,016 | Rives | June 27, 1933 |
| 1,970,423 | Frink | Aug. 14, 1934 |
| 2,055,883 | Terry | Sept. 29, 1936 |
| 2,167,492 | Sproule | July 25, 1939 |
| 2,219,922 | Gossell | Oct. 29, 1940 |
| 2,355,265 | Dodington | Nov. 30, 1943 |
| 2,361,648 | Petty | Oct. 31, 1944 |
| 2,374,204 | Hoover, | Apr. 24, 1945 |
| 2,400,796 | Watts et al. | May 21, 1946 |
| 2,409,632 | King | Oct. 22, 1946 |
| 2,419,340 | Easton | Apr. 22, 1947 |
| 2,427,523 | Dolberg et al. | Sept. 16, 1947 |
| 2,435,960 | Fyler | Feb. 17, 1948 |
| 2,444,950 | Nichols et al. | July 13, 1948 |
| 2,480,385 | Sebring | Aug. 30, 1949 |
| 2,496,998 | Hershberger | Feb. 7, 1950 |